Aug. 26, 1969   HANS-GEORG MONHEIM   3,463,097
PRODUCTION OF LIQUID FILLED CHOCOLATE ARTICLES
Filed Jan. 18, 1967
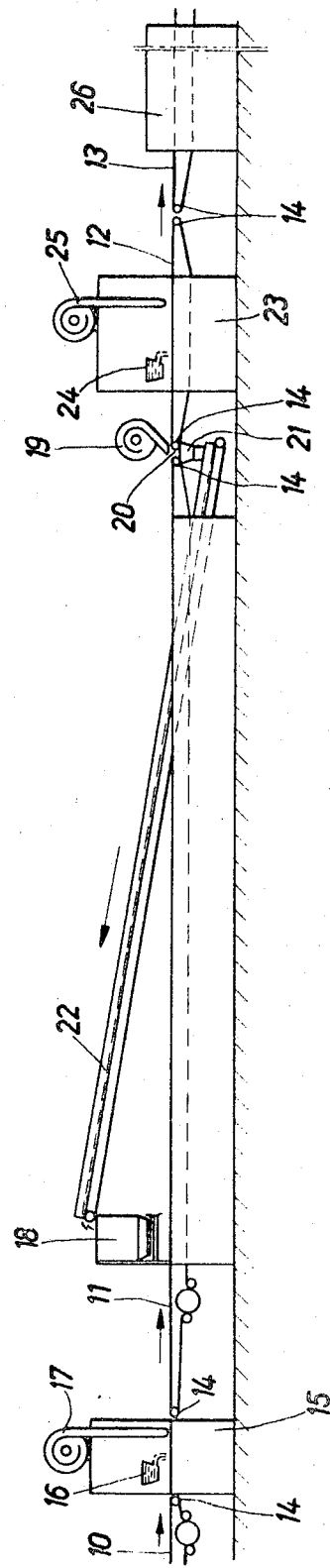
Inventor:
Hans-Georg Monheim
By
Walter Becker United States Patent Office 3,463,097
Patented Aug. 26, 1969

3,463,097
PRODUCTION OF LIQUID FILLED
CHOCOLATE ARTICLES
Hans-Georg Monheim, Aachen, Germany, assignor to
Messrs. Leonard Monheim, Aachen, Germany
Filed Jan. 18, 1967, Ser. No. 610,100
Claims priority, application Germany, Jan. 21, 1966,
M 68,093
Int. Cl. A23g 1/00, 3/20
U.S. Cl. 107—54    5 Claims

ABSTRACT OF THE DISCLOSURE

A method of and apparatus for producing liquid filled chocolate articles, according to which a hollow body adapted to maintain its shape and formed from a mass of chocolate, sugar, or similar substances is filled with a liquid, whereupon said body is coated with a layer of chocolate containing at least one shape maintaining taste carrier and, if desired, flavoring additives, and the thus composed article is formed to its final shape.

---

The apparatus for carrying out said method comprises a plurality of serially arranged conveyor belts of which the first conveyor belt feeds liquid filled chocolate mass or crusty bodies to a first coating device where said bodies are provided with a chocolate film which latter is subsequently subjected to a blast whereupon the thus treated bodies are successively conveyed by further conveyor belts to a device for adding shape maintaining taste carriers to the external surface of the film covered bodies which are then successively subjected to a further blast, whereupon the thus treated bodies are by means of additional conveyors conveyed to a further device for applying a further coating to said bodies. The apparatus furthermore comprises a device which subjects the articles to a blast for blowing off excess chocolate. Finally, the articles are conveyed to a cooling device.

The heretofore known method of producing chocolates with a liquid filling consists in making rigid hollow bodies of the shape of the final item by recrystallizing the exterior sugar coating. These crusty bodies then have a liquid center consisting of the original liquid. It is further known to coat such crusty bodies by dipping them into a molten chocolate-mass. The coating of chocolate then corresponds to the contours of the crusty body, for example a brandy bean, i.e. a bean-shaped candy filled with brandy.

Furthermore liquid filled chocolate articles are known which consist of separately produced shells. These hollow chocolate shells are then filled with a liquid by injection and the opening is closed by a softened plug. Brandy beans, cherry brandy beans, and the like are also manufactured in such a way, that an open-ended shell of chocolate is made, is filled with liquid and is then closed by a film of chocolate.

In chocolate liqueurs, rod-like lemon candies, and the like, which are produced in accordance with the above mentioned first method, the liquid volume also limits the amount of liquid in single pieces. The shape, on the other hand, is determined by the exterior shape of the crusty body.

In the chocolates with a liquid filling, whose manufacture starts with the separate production of a shell, the liquid volume can be varied within wide limits. There is, however, the disadvantage that the chocolate mass, even when safety layers prepared by special operations are used, are softened by the liquid, which appreciably reduces the storage life.

In order to increase the storage life and the variety of different flavors of liquid-filled chocolate articles whose manufacture starts with a shell body, it is further known to place one or more crusty bodies in a separately produced chocolate shell of predetermined shape and to fill the remaining space with a non-liquid mass. In this way the liquid filling is protected in the best way possible, and the final shape is determined by the chocolate shell.

As opposed to these known processes, it is an object of the invention to produce the desired liquid filling of a chocolate article in the form of individual items in further shapes, that is, especially by maintaining the characterizing original shape of the rigid taste carrier and by permitting this to be seen on the surface of the finished items. In this way it is also possible to broaden the taste requirements, as is known, for example, with so-called solid candies, by almond flakes in combination with chocolate or the like. Just as in the above-mentioned production processes the invention goes further in that continuous mechanical production is rendered possible.

According to the present invention, for the production of chocolate items containing a liquid filling, a shape retaining hollow body formed from a mass of chocolate, sugar or the like is filled with a liquid. The filling with a liquid occurs with respect to the shape retaining hollow body including at least one of the elements selected from the group consisting of chocolate and sugar with a liquid. The liquid filling is entrapped within the hollow body and coated with chocolate film and dry taste carriers. The said body is coated with a layer of chocolate containing at least one shape retaining taste carrier and flavoring additives, if desired, and in this way the final shape of the individual item is formed. The shape retaining taste carriers, such as nut flakes, ginger chips, dry raspings, or the like are secured in a first chocolate film and the final shape of the item with the liquid filling is produced in this way.

For further improvement of the three-dimensional configuration of the external surface of each item according to the present invention, the shape retaining hollow body formed of a mass of chocolate, sugar or the like is filled with the liquid. The said body is coated with a first layer of chocolate, said first layer is cooled to a certain degree, a dry taste carrier of constant shape is inserted therein, while the surface is in a plastic condition. Such first chocolate layer which hardens after a period of time is further cooled, unfixed dry taste carriers are blasted off, a further film of chocolate mass is provided, excess chocolate mass is blown off and such coated item is cooled to harden the external layers except the liquid filling. Preferably after applying each film of chocolate and/or taste carriers, the items are blasted by an air stream.

In accordance with another feature of the invention two or more adjacent hollow bodies, each filled with liquid with respect to a shape retaining hollow body including at least one of the elements selected from the group consisting of chocolate and sugar with a liquid, are united and enveloped by the chocolate layer which contains the solid particles of the flavoring substances. By distributing the solid taste carriers such as nut flakes in different sizes on the hollow body, it is possible to make the shape of the finished body to a great extent independent of the shape of the hollow body. The liquid filling is entrapped within the hollow body and coated with chocolate film and dry taste carriers. In this way it can also be brought about that after the application of the first chocolate coating consisting of taste carriers enclosed in a chocolate film the respective hollow bodies are coated with a further layer of constant shape taste carriers of different flavor, and a chocolate film is successively applied forming the final shape.

For shape retaining taste carriers nut chips, almond chips, ginger chips, candied peel, dry raspings, e.g. out of fruits, and also easily soluble crystalline fruit acids are of importance. Flavoring materials can be added to the chocolate in additional substances known per se such as milk, aromatic substances and the like.

The invention will now be described in greater detail by way of the following examples:

EXAMPLE I

Crusty bodies of predetermined shape formed of moulding powder which have a filling of a predetermined volume of, for example, kirsch are coated with chocolate on a coating machine. Another coat of chocolate, which consists largely of nut flakes, having a thin outer coating, is applied to the preceding coating while it is cooling. The nut flakes cover and envelop the liquid center as taste carriers. After solidification, items of predetermined shape are on hand, which by the combination of the liquid filling with the firm taste carrier give surprising taste effects when eaten.

EXAMPLE II

A crusty body produced in accordance with Example I of an approximate disc-shape with a filling consisting of orange juice is enrobed on a coating machine with a chocolate film which is consolidated by cooling to a certain degree. This cooling may be carried out by a blast removing excess of chocolate mass, at the same time. Ginger chips and bitter chocolate chips are embedded in the consolidating mass while further cooling. After the setting of nearly all chips the unfixed ones are blasted off and a further chocolate film is applied determining the final appearance of the surface of the item and fixing the chips additionally. Before the final solidification of the surface, the items produced in this way and having a coating of taste carriers are again blasted in a stream of air.

In this way the size of the basic crusty body is increased by two or three times.

The degree and kind of flavor of the solidified item is determined by the blending of the liquid filling with the firm taste carriers.

EXAMPLE III

A shell body of chocolate which contains an alcoholic liquid filling of predetermined flavoring and which has a predetermined shape is provided with firm taste carriers according to Example I or Example II.

The solid particle taste carriers are chosen with respect to one another and the liquid filling to obtain a predetermined flavor. A shell body can also for example be chosen as starting body in which besides the liquid filling a fruit or the like can be inserted.

Several layers of firm taste carriers one after another could also be used. The first layer of taste carrier can be fixed in the outer chocolate layer of the shell body if the surface thereof is softened. Crystallized citric acid can be used as additional taste carrier which is applied to the chocolate film covering the first taste carrier. The application and blasting of the external chocolate film are carried out in accordance with Example II.

EXAMPLE IV

A hollow body produced separately on a sugar-drawing machine with a sugar crust, which has a liquid filling, or a sugar coated body with a liquid filling is provided with a coat having a shape retaining taste carrier according to Examples I to III. The one or more chocolate films used contain flavoring substances compatible with the flavoring of the liquid filling and may also vary from layer to layer.

EXAMPLE V

A shell body of predetermined form filled with liquid and a crusty body produced in accordance with Example I with different liquid fillings are joined on a coating machine by a single chocolate film containing a firm taste carrier to form a shaped item. The different liquid fillings can be predetermined to be complementary to each other as regards flavor. The taste carrier added in solid form can contain yet another flavoring component. Instead of two center filled with liquid, three or more liquid-filled center can be used. In this way a wider range of flavors can be obtained by selecting compatible liquid and solid taste carriers or by the flavoring added to the chocolate.

EXAMPLE VI

A liquid-filled center is joined with taste carriers in solid particle form in such a way that the liquid filling and solid taste carriers are embedded adjacent to one another in one single piece. When eaten, the taste carriers consisting of solid particles are tasted before the liquid filling. By the predetermined distribution of the liquid filling and of the solid taste carriers,, which can also be marked by a light or dark film of chocolate, more variations in flavor can be produced in the final item.

Other objects not specifically set forth will become apparent from the following detailed description in conjunction with the drawing diagrammatically illustrating a preferred form of an apparatus according to the invention for forming coated items in a continuous manner.

The conveyor belts 10, 11, 12 and 13 are disposed one behind the other in the direction of advance and are guided as endless belts over rollers 14. The direction of movement of the belts 10 to 13 is shown by arrows.

The hollow bodies consisting of chocolate mass or crusty bodies with a liquid filling are supplied on belt 10. In a first coating device 15 the hollow bodies are provided with a chocolate film having a thickness of from 1–2 millimeters, the chocolate mass being distributed on the surface of the hollow body of a supply hopper 16. Thereupon the item provided with the first layer is subjected to a blast 17 while simultaneously a limited solidification of the chocolate mass is obtained.

By means of the belt 11 the thus coated hollow body is conveyed to a strewing device consisting of a strewing hopper 18 which applies shape retaining taste carriers to the external surface of each item. The items are then conveyed to a further blast 19 by the belt 11 having a distance provided between the strewing hopper 18 and the blast 19 permitting further drying of the chocolate mass, thus fixing the embedded shape retaining taste carriers. The nozzle of the blast 19 is directed to a gap 20 between the conveyor belts 11 and 12, i.e. their adjacent end rollers 14. A funnel 21 is provided below the gap 20, which is disposed above a further conveyor belt 22. This belt 22 moves in opposite direction to the conveyor belt 11 and extends on to the strewing hopper 18, so that it ends above the strewing hopper 18.

By means of the blast 19 unfixed chips are blown off the surface of the coated hollow body and enter the funnel 21 through the gap 20. Then the chips are guided back into the strewing device by means of the belt 22 and thus may be used again for coating purposes.

After the preliminary cooling on the conveyor belt 11 the items coated with shape retaining taste carriers are conveyed to a further device 23 in which the items are provided with a further coat consisting, for instance, of chocolate mass which is supplied by a feeding hopper 24. In this advice 23 there is also provided a blast 25 which is directed onto the thus prepared chocolate surface in such a manner that excess of chocolate mass is removed, the form of the shape retaining taste carriers being maintained, while the items are covered with a thin film of chocolate having a thickness of about 1–2 millimeters.

By means of the belt 13 the items are conveyed from the belt 12 to a cooling apparatus 26 which secures final consolidation of the chocolate cover.

The blasts 17, 19 and 25 are conveniently working with purified or filtered air. The pressure of air and the temperature may be adjusted in a wide range in accordance with the actual requirements. The blasts 17 and 25 are preferably operated at a temperature of air of 30° C., the quantity of air being about 3600 cubic meters per hour and the pressure being 165 millimeters water column. The velocity of air is about 40 meters per second.

The hollow bodies supplied on the conveyor belt 10 may have a diameter of, for instance, 10–16 millimeters and be of semi-spherical shape. Then the taste carriers have a size of preferably 4–5 cubic millimeters.

Chocolate articles produced in accordance with the invention are almost unaffected by storage without the liquid filling acting in an undesired way on the solid taste carrier or flavoring. The most varied taste combinations are possible, which only become effective on eating and only then do the successively predetermined flavorings display their effectiveness. Because the liquid filling only combines with the solid flavor carrier when eaten, complete effectiveness of the nuances of taste is obtained. Impairment of the taste nuances for example by storing is obviated.

What I claim is:

1. A process for producing liquid-filled chocolate items comprising the steps of: filling a shape retaining hollow body including at least one of the elements selected from the group consisting of chocolate and sugar with a liquid; coating said body with a first layer of chocolate; cooling said first layer to a desired degree; inserting shape retaining dry taste carrier means therein while the surface is in a plastic condition; further cooling said first chocolate layer which hardens after a period of time; blasting off unfixed taste carrier means; providing a further film of chocolate mass; blowing off excess of chocolate mass; and cooling the thus coated item to harden said layers.

2. A process of producing liquid-filled chocolate items comprising the steps of: filling a shape retaining hollow body composed of at least one of the elements selected from the group consisting of chocolate and sugar with a liquid; coating said body with at least one layer of chocolate containing shape retaining taste carrier means thereby forming the final shape of the individual item; said shape retaining taste carrier means being selected from the group consisting of nut flakes, ginger chips, and dry raspings; and securing said constant shape retaining taste carrier means by at least one chocolate film, thereby determining the final shape of the liquid-filled item.

3. A process as claimed in claim 1, which includes the steps of: disposing of at least two liquid-filled hollow bodies adjacent each other and enveloping the same in a chocolate film having incorporated therein solid particles of a flavoring substance.

4. A process as claimed in claim 1, which includes the steps of: coating shape retaining hollow bodies having a first chocolate coat of at least one flavor of taste carrier means enclosed between chocolate films with an additional layer of shape retaining taste carrier means having a different flavor, and applying a chocolate film to the thus formed candy thereby giving it its final shape.

5. An apparatus for producing chocolate items each comprising a liquid filling entrapped within a hollow body coated with chocolate films and dry taste carriers, said apparatus including: a first coating device, a first conveyor belt for feeding liquid-filled hollow bodies to said first coating device for coating the surface of each hollow body, said first coating device being provided with a blast for shaping a thin chocolate film on the surface of said body, a strewing device having a strewing hopper for applying shape retaining taste carriers to said surface while the chocolate film is in a soft moldable condition, a second conveyor belt having such rate of movement that the chocolate film hardens while fixing the dry taste carriers, an additional blast for removing unfixed carriers, a returning device for returning said unfixed taste carriers to said strewing device, a further coating device having a feeding hopper and a third blast for applying a thin chocolate film to the external surface of the hollow body upon the dry taste carriers to thereby form the final shape of each individual item, and a cooling device for hardening the items.

References Cited

UNITED STATES PATENTS

| | | | |
|---|---|---|---|
| 1,484,016 | 2/1924 | Fisher | 107—1 |
| 1,777,896 | 10/1930 | Rossi. | |
| 1,608,302 | 11/1926 | Cloud. | |

FOREIGN PATENTS

| | | |
|---|---|---|
| 840,390 | 7/1960 | Great Britain. |

EDWARD L. ROBERTS, Primary Examiner

U.S. Cl. X.R.

107—4